March 6, 1956  M. WHEELER-NICHOLSON  2,737,415
PAINT SPRAY GUN
Filed Jan. 29, 1953  2 Sheets-Sheet 1
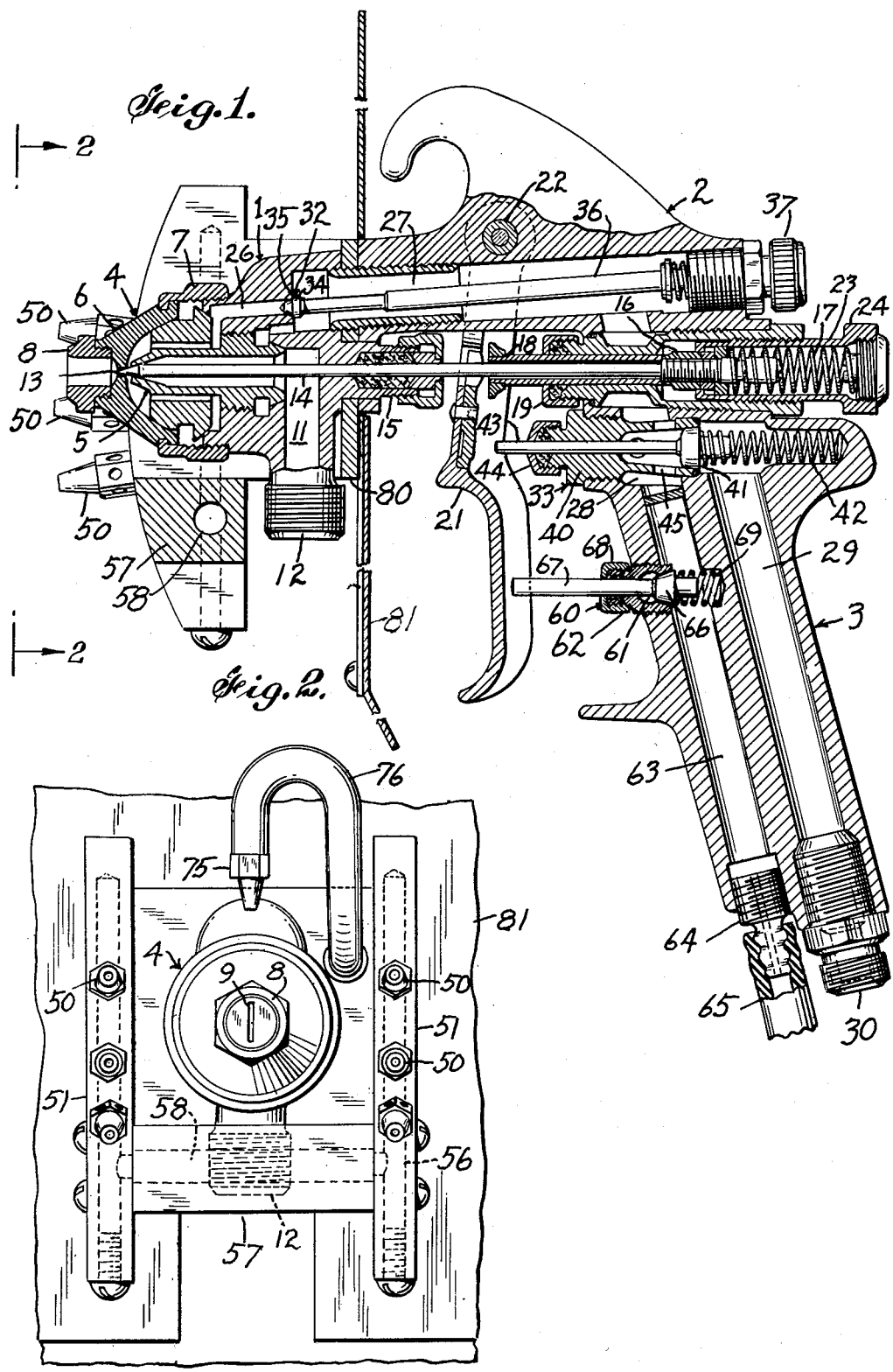

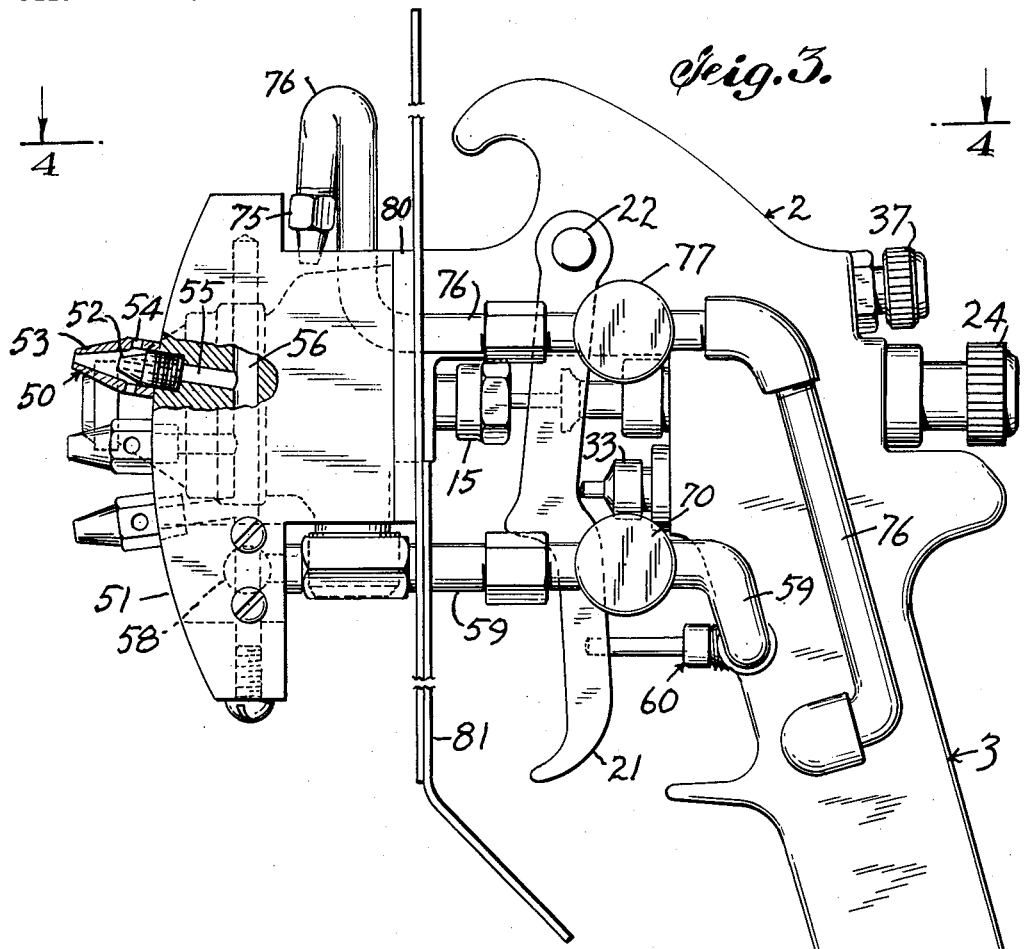
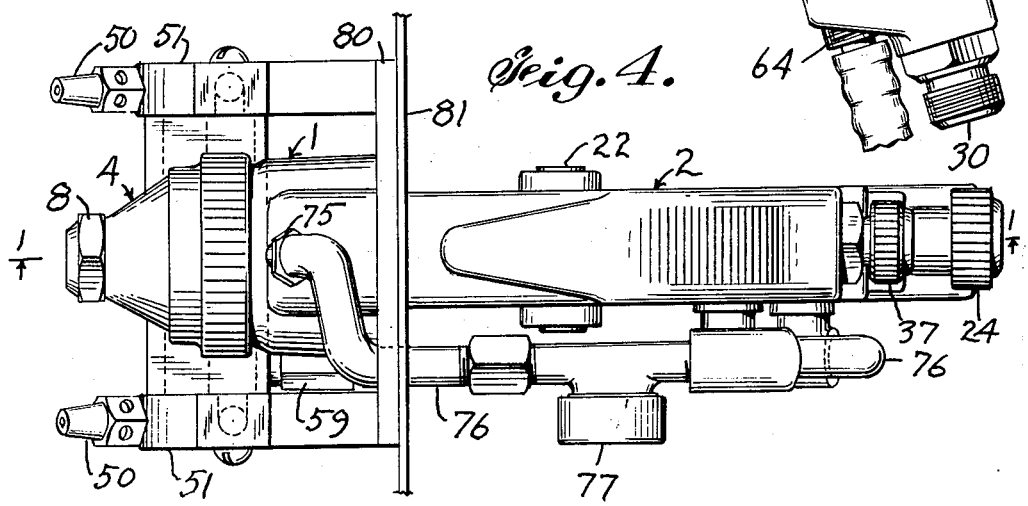

United States Patent Office

2,737,415
Patented Mar. 6, 1956

2,737,415

PAINT SPRAY GUN

Malcolm Wheeler-Nicholson, Bayside, N. Y., assignor to Elsa Wheeler-Nicholson, Bayside, N. Y., as trustee Application January 29, 1953, Serial No. 333,929

10 Claims. (Cl. 299—86)

The present invention relates to paint spray guns, the term "paint" being herein used generically to include paints, lacquers, enamels, varnishes and other coating materials. Such materials ordinarily, but not necessarily, comprise pigments and a suitable carrier or "vehicle" for the pigments.

It is an object of the present invention to provide apparatus that will permit the use of tougher and more durable "vehicles" for the pigments, by substituting for the present drying oils, dependent upon evaporation for their solidification, substances that are themselves solids, such as resins and plastics, which are reduceable to flow viscosity by heat but, when cooled, harden into tough and durable coatings. The invention thus permits depositing upon the target a coating that is composed substantially entirely of solids. This permits important savings by making it possible to use a single coating instead of multiple coatings, shortening the drying time, avoiding the need of frequent renewal of coatings, and eliminating extra processes, such as baking in the application of lacquers to secure adhesion and hardness. The invention also provides greater economies in packaging, shipping and storing the coating material by permitting the manufacture of coatings in concentrated, solid, form instead of in the form of solids dispersed in liquids, drying oils and thinners.

In accordance with the invention, the elimination of volatile solvents as "thinners" and the attaining of a tougher and more durable "vehicle" is made possible by the substitution of heat to attain flow viscosity instead of using volatile liquids. The use of heat in applying the coating makes it possible to obtain a stronger film, composed solely of a vehicle and pigments, by using substances such as resins, plastics and waxes of maximum hardness and durability, which qualities are more readily found in substances of higher melting point than can effectively be used by other methods.

In accordance with the invention, the heat is used to serve several purposes. It cleans the surface to be coated, as, for example, by removing an oil film or a previous coating. It preheats metallic surfaces, thereby preparing the surface for better adhesion of the coating. It dries wet surfaces, thus preventing work stoppages in inclement weather and making it possible to coat surfaces subject to moisture condensation or seepage, such as dry dock structures. It preheats the compressed air used in spraying the coating material and prevents any deleterious drop in its temperature through expansion. It maintains the temperature of the preheated coating material and thereby maintains its flow viscosity by keeping essential parts of the gun at a predetermined elevated temperature. Its flame action smooths the film after deposit upon the surface and eliminates pin-holing. It bakes the film into a firm bond with the surface, thus eliminating an extra baking process such as that used in many types of work. It permits the use of coating materials which harden as they cool, thus making substantial savings in drying time and curing time. When used with appropriate coating formulations, the flame action converts thermo-plastic materials into thermo-setting coatings by polymerizing action, thus permitting the use of many valuable thermo-setting substances ordinarily unusable as protective coating.

While the spray gun in accordance with the invention is intended primarily for use as a flame spray gun, it is exceedingly flexible in its operation and may be used as a standard cold paint spray gun, as an improved hot spray gun for all purposes where hot spraying of coatings is suitable, as a flame spray gun capable of using higher melting point substances and fixing them upon the target by baking with flame and heat and as a flame cleaning and drying unit for surfaces where it is applicable.

Other objects and advantages of the invention will become apparent from the following description and claims in conjunction with the accompanying drawings which illustrate, by way of example, a preferred form of the invention.

In the drawings:

Fig. 1 is a longitudinal section of a paint spray gun embodying the invention, being taken approximately on the line 1—1 in Fig. 4 with certain portions broken away for the sake of clarity.

Fig. 2 is a partial front view taken approximately from the line 2—2 in Fig. 1.

Fig. 3 is a side elevation of the apparatus shown in Fig. 1, with portions broken away.

Fig. 4 is a top view, looking at the apparatus from approximately the line 4—4 in Fig. 3.

The paint spray gun shown by way of example in the drawings comprises a head portion 1 and a body portion 2 having a handle 3. The head portion 1 comprises a paint spray head 4 having a paint nozzle 5 and an air nozzle 6 which surrounds the paint nozzle and is removably held in place by a threaded retaining collar 7. A tip portion 8 is screwed into the air nozzle 6 and has a vertically extending elongated orifice 9 (Fig. 2) so as to produce a flat vertically extending fan-shaped spray.

The coating material, herein for convenience called "paint," is supplied to the paint nozzle 5 through a passageway 11 leading to a hose connection 12. Preheated paint is preferably supplied through a heated hose connected to the threaded connection 12. The hose may, for example, be heated by electrical resistance incorporated in its walls. The flow of paint is controlled by a needle valve 13 (Fig. 1) having a stem 14 which extends rearwardly through the passage 11 out through a packing gland 15 and into the handle 3. A nut 16, screwed onto the threaded rear end of the stem 14, is engaged by a compression spring 17 that tends to hold the needle valve in closed position. The opposite end of the nut 16 is engaged by a pusher sleeve 18 which surrounds the stem 14 and extends out through a packing gland 19. A trigger 21, pivotally connected to the body portion 2 at 22, engages the forward end of the pusher sleeve 18 when the trigger is pulled rearwardly toward the handle 3 to push rearwardly on the sleeve 18, thereby moving the valve stem 14 in a rearward direction against the action of spring 17 to open the needle valve 13. The needle valve 13 is adjustable by means of a threaded sleeve 23 that is rotatable by means of a knob 24.

Compressed air or other gas under pressure is supplied to the air nozzle 6 through passageways 26, 27, 28 and 29 leading to a threaded connector 30 adapted to be connected to an air hose. The supply of air to the air nozzle of the paint spray head is controlled by an adjustable valve 32 and a cut-off valve 33. The adjustable valve 32 comprises a valve member 34 adapted to seat on a valve seat 35 provided at the junction of passageways 26 and 27. The valve member 34 is movable by means of a stem 36 that extends rearwardly through the passage 27 and, at its rearward end, is provided with an adjustment knob 37 which, through a threaded connection, is adapted to move the valve stem 36 axially upon rotation of the knob, thereby adjusting the opening of the valve 32.

The cut-off valve 33 comprises a body portion 40 which is screwed into a threaded opening in the handle 3 and provides a valve seat at its inner end. A valve member 41 is pressed into engagement with the valve seat by a compression spring 42. A valve stem 43 extends forwardly from the valve member 41 and out through a packing gland 44. The forward end of the valve stem 43 is engaged by the trigger 21 when the latter is pulled rearwardly to open the valve. When the valve is opened, compressed air flows from the passage 29 past the valve member 41 into the interior of the valve body 40 and then out through openings 45 into the passage 28 which communicated with passages 27 and 26 leading to the air nozzle 6. The adjustable valve 32 is set to provide the proper air flow for the desired paint spray. The cut-off valve 33, actuated by the trigger 21, interrupts the supply of air to the nozzles to permit intermittent operation of the spray gun.

In accordance with the invention, the spray gun is provided with flame nozzles 50 on opposite sides of the paint spray head 4. The nozzles are arranged in two parallel vertical banks, each bank consisting of a plurality of nozzles—for example three, as shown—mounted on a base portion 51. The base portions 51 are arcuately convex. The nozzles project approximately radially from the arcuate base and are hence divergent, so that each bank of nozzles provides a fan-shaped flame approximately parallel to the fan-shaped paint spray provided by the spray head. Each of the nozzles 50 comprises an inner fuel jet 52 (Fig. 3) surrounded by an air nozzle 53 with an annular space between the air nozzle and the fuel jet. A plurality of holes 54 admit atmospheric air into the annular space between the fuel jet and the air nozzle. Gaseous fuel, for example acetylene gas, is supplied to the fuel jet 52 through radial passageways 55 communicating with vertical passageways 56 in the base portions 51. The two base portions 51 are connected by a transverse portion 57 in which there is provided a passageway 58 (Figs. 1 and 2) communicating with the vertical passageways 56 in the base portions 51. A fuel supply line 59 communicates with the passage 58 and leads to a chamber 61 in the valve body 62 of a fuel valve 60 provided in the handle 3. From the valve 60, a passageway 63 formed in the handle 3 leads to a coupling 64 provided for the connection of a fuel supply hose 65 (Fig. 1). The valve body 62 of the fuel valve 60 provides a seat for a valve member 66 having a valve stem 67 that extends out through a packing gland 68 and is engaged by the trigger 21 when the trigger is pulled rearwardly to open the valve 60. A compression valve 69 tends to hold the valve member 66 in closed position. An adjustable valve 70 is provided in the fuel supply line 59 to regulate the amount of fuel supplied to the flame nozzles 50 when the fuel valve 60 is open.

A heater nozzle 75 is disposed between the two banks of flame nozzles 50 and is directed onto the spray head 4 so as to maintain the spray head at a predetermined elevated temperature. As illustrated in Figs. 2, 3 and 4, the heater nozzle 75 is located above the spray head 4 and directed downwardly toward it. The heater nozzle 75 is similar to the flame nozzles 50 but may, in some instances, be somewhat smaller. Fuel is supplied to the heater nozzle 75 by a fuel line 76 which extends upwardly and then downwardly and rearwardly and taps into the fuel passage 63 in the handle 3 in advance of the fuel valve 60. Hence, fuel is supplied to the heater nozzle 75 even when the valve 60, which controls the supply of fuel to the flame nozzles 50, is closed. In the fuel line 76 that supplies fuel to the heater nozzle 75, there is provided an adjustable valve 77 by means of which the supply of fuel to the heater nozzle 75 may be regulated or cut off.

The heater nozzle 75 not only maintains the temperature of the spray head 4 but also serves as a pilot for the flame nozzles 50. With the arrangement shown, fuel issuing from the flame nozzles 50 can be ignited by moving the spray gun back and forth laterally, i. e. alternately to the right and left as viewed in Fig. 2, so that some of the fuel is carried into the flame from the heater jet 75. Instead of being located centrally as shown, the heater jet 75 may be located off-center and directed downwardly and laterally, as viewed in Fig. 2, so that the flame from the heater nozzle is directed diagonally toward one of the banks of flame nozzles 50.

The body portion 2, including the handle 3, is thermally isolated from the head portion 1 by a layer 80 of heat-insulating material. The handle portion of the spray gun is further protected from the heat of the flame by a heat-insulating shield 81. The term "heat-insulating" is herein used in a broad sense of preventing or restraining the passage of heat, for example by heat insulation, heat reflection, or otherwise. By means of the heat-insulation 80 and the shield 81, the handle and rear portion of the spray gun can be maintained relatively cool despite the heat generated by the flames from nozzles 50 and 75.

The pusher sleeve 18 and the valve stems 43 and 67 (Fig. 1) are preferably set so that the operation of the valves 60, 33 and 13 is sequential. A first instrument of movement of the trigger 21 in a rearward direction opens the fuel valve 60, to supply fuel to the flame nozzles 50. Further rearward movement of the trigger opens the air valve 33 and the paint needle valve 13, to put the paint spray head into operation. Preferably, the air valve 33 opens slightly in advance of the paint control valve 13.

In using the apparatus as a flame gun, the valve 77 (Fig. 3) is opened to supply fuel to the heater and pilot nozzle 75 and is adjusted to provide the desired size of flame. The trigger 21 is then squeezed sufficiently to open the fuel valve 60 controlling the supply of fuel to the flame nozzles 50. The fuel issuing from the nozzles 50 is ignited from the pilot 75. The size of the flame is adjustable by the valve 70. The operation of the flame nozzles 50 is ordinarily intermittent, under control of the trigger 21. The heater and pilot nozzle 75 burns continuously—while the gun is in use—so as to keep the spray head hot and provide for ignition of the fuel supplied to the flame nozzles 50.

With the trigger pulled sufficiently to open the fuel valve 60, supplying fuel to the flame nozzles 50 but not sufficient to open the compressed air valve 33 or the paint control valve 13, the flame of the gun is used to clean and preheat the surface to be painted. The trigger is then pulled farther to open the compressed air valve 33 and paint valve 13 and paint is sprayed onto the preheated surface with a side-to-side movement of the gun, whereby the paint deposited on the surface is smoothed out by the flames and securely bonded to the surface by fusion. After a selected area of the surface has been coated, the trigger can be slightly relaxed to cut off the paint spray head while continuing the flame to further heat and smooth the coated surface if such further heating is desired.

If it is desired to use the apparatus merely as a hot spray gun rather than as a flame spray gun, the valve 70 (Fig. 3) in the fuel line to the flame nozzles 50 is closed. The heater nozzle 75 keeps the spray head hot so that the material being sprayed will not congeal in the spray head and the cooling effect created by expansion of the compressed air is counteracted. The gun can also be used as an ordinary cold spray gun by closing both of the valves 70 and 77 (Fig. 3). Great flexibility of operation is thereby provided.

While a preferred embodiment of the invention has been illustrated by way of example in the drawings, it will be understood that the invention is not limited to this specific embodiment and that changes may be made in the construction without departing from the scope of the invention as defined by the appended claims.

What I claim and desire to secure by Letters Patent is:

1. In a hot paint spray gun, a paint spray nozzle for liquid paint, passageways connecting said nozzle with hot paint and compressed gas supplies, flame nozzles disposed on opposite sides of said paint nozzle and positioned to direct flames approximately parallel to a paint spray from said nozzle, a heater nozzle directed toward the paint spray nozzle, passageways connecting said flame nozzles and heater nozzle with a fuel supply, valves in said passageways and controlling the supply of paint, compressed gas and fuel to the respective nozzles, including separate valves in the passageways leading respectively to said flame nozzles and said heater nozzle to permit continued supply of fuel to said heater nozzle while the supply of fuel to said flame nozzles is intermittently cut off.

2. In a hot paint spray gun, a paint spray nozzle for liquid paint, passageways connecting said nozzle with hot paint and compressed gas supplies, flame nozzles disposed on opposite sides of said paint nozzle and positioned to direct flames approximately parallel to a paint spray from said nozzle, a heater nozzle disposed between said flame nozzles and directed toward said paint nozzle in such position as to heat said paint nozzle and ignite fuel issuing from said flame nozzles, passageways connecting said flame nozzles and heater nozzles with a fuel supply, valves in said passageways and controlling the supply of paint, compressed gas and fuel to the respective nozzles, including a quick-acting operator-controlled valve in the passage leading to the flame nozzles to cut off the supply of fuel to said flame nozzles intermittently, said quick-acting valve being by-passed by a fuel passage leading to said heater nozzle, to supply fuel to said heat nozzle when the supply of fuel to the flame nozzles is cut off.

3. In a hot paint spray gun, a liquid paint spray nozzle having an elongated discharge orifice producing a vertical fan-shaped spray, passageways connecting said nozzle to hot paint and compressed gas supplies, two vertical banks of flame nozzles disposed on opposite sides of said paint spray nozzle, each of said banks comprising a plurality of nozzles which are divergent to provide a fan-shaped flame approximately paralleling the fan-shaped paint spray, a heater nozzle disposed between said banks of flame nozzles and directed toward said paint spray nozzle in such position as to heat said paint spray nozzle, passageways connecting said flame nozzles and heater nozzles with a fuel supply, and valves in said passageways including a quick-acting operator-controlled valve in the passage leading to the flame nozzles to cut off the supply of fuel to said flame nozzles intermittently, said quick-acting valve being by-passed by a fuel passage leading to said heater nozzle to supply fuel to said heater nozzle when the supply of fuel to the flame nozzles is cut off.

4. In a hot paint spray gun, a liquid paint spray nozzle having an elongated discharge orifice producing a vertical fan-shaped spray, passageways connecting said nozzle to hot paint and compressed gas supplies, two vertical banks of flame nozzles disposed on opposite sides of said paint spray nozzle, each of said banks comprising a plurality of nozzles which are divergent to provide a fan-shaped flame approximately paralleling the fan-shaped paint spray, a heater nozzle disposed between said banks of flame nozzles and directed toward said paint spray nozzle in such position as to heat said paint spray nozzle, passageways connecting said flame nozzles and heater nozzles with a fuel supply, and valves in said passageways to control the supply of paint, compressed gas and fuel to the respective nozzles.

5. In a hot paint spray gun, a liquid paint spray nozzle, passageways connecting said nozzle with hot paint and compressed gas supplies, flame nozzles disposed on opposite sides of said paint nozzle, a heater nozzle directed toward the paint spray nozzle to heat said paint spray nozzle, passageways connecting said flame nozzles and heater nozzle with a fuel supply, valves in said passageways to control the supply of compressed gas to said paint spray nozzle and the supply of fuel to said flame nozzles, said valves being individually operable to supply fuel to said flame nozzles while the valve controlling the supply of compressed gas to said paint spray nozzle is closed.

6. In a hot paint spray gun, a liquid paint spray nozzle, passageways connecting said nozzle with hot paint and compressed gas supplies, flame nozzles disposed on opposite sides of said paint nozzle, a heater nozzle directed toward the paint spray nozzle to heat said paint spray nozzle, passageways connecting said flame nozzles and heater nozzle with a fuel supply, valves in said passageways to control the supply of compressed gas to said paint spray nozzle and the supply of fuel to said flame nozzles, and an operator-controlled valve-operating member connected to and actuating said valves, said valve-operating member, when moved in a valve-opening direction, acting first on the valve controlling the supply of fuel to said flame nozzles and then acting on the valve controlling the supply of compressed gas to said paint spray nozzle.

7. In a hot paint spray gun, a liquid paint spray nozzle, passageways connecting said nozzle with hot paint and compressed gas supplies, flame nozzles disposed on opposite sides of said paint nozzle, passageways connecting said flame nozzles with a fuel supply, and valves in the passageways controlling the supply of compressed gas to the paint spray nozzle and the supply of fuel to said flame nozzles, each of said flame nozzles comprising a jet connected with the fuel supply passageway and an outer nozzle surrounding said jet with an annular space between, said outer nozzle having an opening for admitting air to said annular space for admixture with fuel issuing from said jet.

8. In a hot paint spray gun, a head portion comprising a liquid paint spray nozzle and flame nozzles disposed on opposite sides of said paint spray nozzle, and a handle portion, means for supplying hot paint to said spray nozzle, passageways extending from said nozzles through said handle portion and including a passage connecting the paint spray nozzle with a supply of compressed gas and a passageway connecting the flame nozzles with a fuel supply, valves in said handle portion controlling the supply of compressed gas to the paint spray nozzle and the supply of fuel to the flame nozzles and a heat insulating and reflecting shield disposed between said head portion and handle portion and thermally isolating said handle portion from said head portion and reflecting heat toward a surface being painted.

9. A spray gun for preheating a surface to be painted, applying liquid paint to said surface and baking said liquid paint on said surface in a continuous operation comprising a liquid paint spray nozzle, means for supplying preheated liquid paint and compressed air to said nozzle to direct a spray of said liquid paint toward said surface, flame nozzles disposed on opposite sides of said liquid paint spray nozzle and positioned to direct fan-shaped flames toward said surface in planes parallel to each other and to the direction of said paint spray whereby said surface is heated without heating the liquid paint in said spray above a critical temperature and means for supplying fuel to said flame nozzles.

10. A spray gun for preheating a surface to be painted, applying liquid paint to said surface and baking said paint on said surface in a continuous operation, comprising a liquid paint spray nozzle, means for supplying preheated liquid paint and compressed air to said nozzle to direct a spray of said liquid paint toward said surface, flame nozzles disposed on opposite sides of said liquid paint spray nozzle, means for supplying fuel to said flame nozzles, said flame nozzles being positioned to direct fan-shaped flames toward said surface in planes approximately parallel to said spray and a reflecting shield behind said flame nozzles and positioned to reflect heat from said flame nozzles onto the surface being painted and onto said liquid paint nozzle to maintain said nozzle at an elevated temperature.

References Cited in the file of this patent

UNITED STATES PATENTS

| | | |
|---|---|---|
| 1,843,842 | Schoop | Feb. 2, 1932 |
| 1,897,683 | Tracy | Feb. 14, 1933 |
| 2,052,362 | Roselund | Aug. 25, 1936 |
| 2,207,765 | Stevens | July 16, 1940 |
| 2,482,794 | Peterson | Sept. 27, 1949 |

FOREIGN PATENTS

| | | |
|---|---|---|
| 859,917 | France | Sept. 20, 1940 |